M. SWARTZMAN.
SAFETY DEVICE FOR MOTOR VEHICLES.
APPLICATION FILED SEPT. 28, 1921.
1,427,242.                                  Patented Aug. 29, 1922.
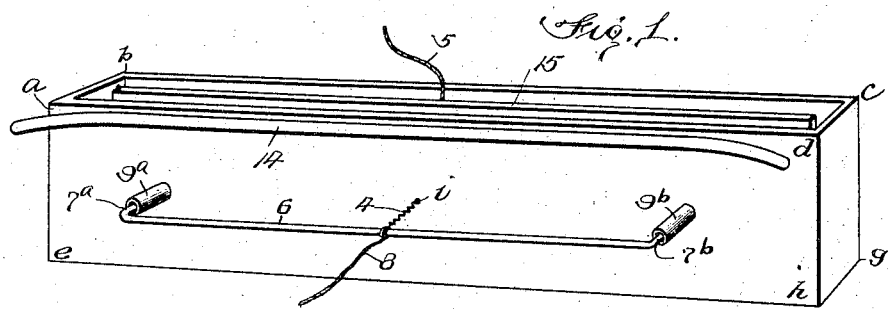
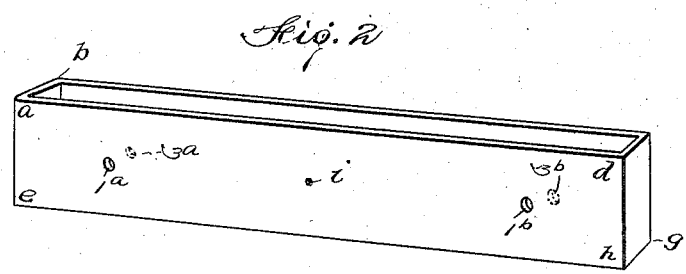
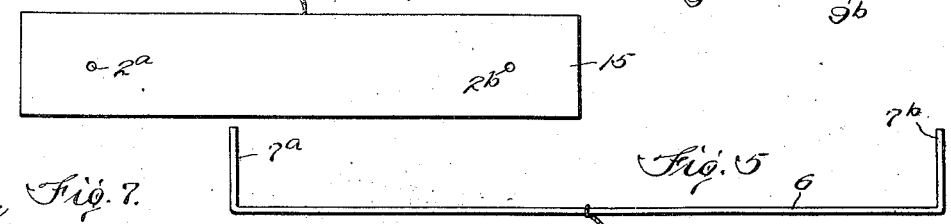
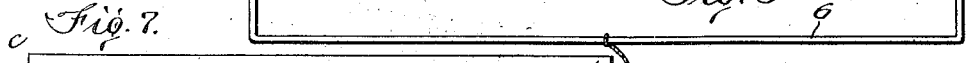
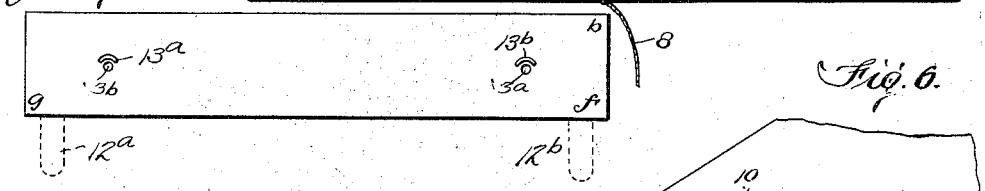
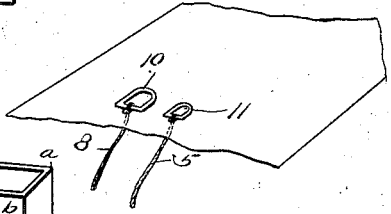
Inventor.
Morris Swartzman

UNITED STATES PATENT OFFICE.

MORRIS SWARTZMAN, OF BROOKLYN, NEW YORK.

SAFETY DEVICE FOR MOTOR VEHICLES.

1,427,242.   Specification of Letters Patent.   Patented Aug. 29, 1922.

Application filed September 28, 1921. Serial No. 503,819.

*To all whom it may concern:*

Be it known that I, MORRIS SWARTZMAN, a citizen of the United States, residing at Brooklyn, in the county of Kings and State of New York, have invented a new and useful Safety Device for Motor Vehicles, of which the following is a specification.

The object of my invention is to provide a device that will serve to prevent pedestrians who are accidentally struck by moving motor vehicles from being touched by the wheels of said vehicles and from falling under said vehicles.

While the design and construction at present illustrated and set forth is deemed preferable, it is obvious that as a result of the reduction of the invention to a more practical form for commercial purposes, the invention may be susceptible to changes, and the right to these changes is claimed, provided they are comprehended within the scope of what is claimed.

The invention is illustrated in the accompanying drawings, in which—

Figure 1 is a perspective of the entire device as viewed from behind the bumper of the vehicle, the device being attached to the front of said bumper; Fig. 2 is a perspective view of one of the component parts of the device; Fig. 3 is a side elevation of another component part; Fig. 4 is a side elevation of two other component parts; Fig. 5 is a side elevation of another component part; Fig. 6 is a diagram indicating the part of the floor of the vehicle that is near the operator; Fig. 7 is a view, from directly in front of the vehicle, of the device when it is not in operation; and Fig. 8 is a perspective view, from in front of the vehicle, of the device when it is in operation, details $13^a$ and $13^b$ of Fig. 7 being here omitted for the purpose of better illustrating the operation.

Similar numerals refer to similar parts throughout the several views.

Figure 2 illustrates a simple construction of four thin rectangular walls or sides. It may be called a hollow cube with the top and bottom sides removed, rectangles $a$, $b$, $c$, $d$ and $e$, $f$, $g$, $h$, representing the open surfaces at the top and bottom. I shall refer to this construction as a "frame." The hole $1^a$ is fifteen (15") inches directly to the left of point $i$, the center of the rectangle $e$, $a$, $d$, $h$, and the hole $1^b$ is the same distance to the right of point $i$. The holes $3^a$ and $3^b$ are similarly located on the rectangle $f$, $b$, $c$, $g$ and are directly behind the holes $1^a$ and $1^b$. All four holes are each one and one-half inches ($1\frac{1}{2}''$) in diameter. Directly above and touching point $i$ is attached a coil spring 4. This coil spring is permanently attached to rectangle $e$, $a$, $d$, $h$. The height of the frame, $ae$, is equal to twice the distance between the ground and the bottom of the frame. The length $ad$ is equal to the length of a straight line drawn between the ends of the bumper to which the frame is attached. The width $ab$ is slightly larger than the width of the plate that is enclosed in the frame.

Figure 3 illustrates a thin rectangular plate 15 of the same height as the frame. The length and the thickness of the plate are such as to enable it to move freely inside the walls of the frame and yet be as close as possible to these walls. The holes $2^a$ and $2^b$ are of the same size and relative location as the holes of the frame. A wire rope 5 is attached to the middle of the top edge of the plate.

Figure 4 illustrates two hollow tubes open at both ends. Each tube is one and one-half inches ($1\frac{1}{2}''$) in diameter and four inches (4") long.

Referring to Figure 5, the rod 6 is thirty inches (30") long and one-half inch ($\frac{1}{2}''$) in diameter. The rods $7^a$ and $7^b$ are each one-half inch ($\frac{1}{2}''$) in diameter, their length being such as to enable each to run through the hollow tubes and all the holes of the plate and frame and yet project one-half inch ($\frac{1}{2}''$) beyond the outer rectangle. These rods are rigidly and permanently attached to the ends of rod 6 at right angles and in the same plane. A wire rope 8 is attached to the middle of rod 6.

Figure 1 illustrates the invention, with all the above-mentioned details properly assembled. The bumper 14 of the vehicle is in attachment with the top part of the rectangle $e$, $a$, $d$, $h$, so that the top edge of the bumper is on a level with the top edge of the rectangle. The ends of the bumper curve away from but are directly behind and on a level with points $a$ and $d$, the top points of the rectangle. As regards the method of attaching the device to the bumper, I regard clamps as suitable for the purpose. However, this matter is not a part of my invention, nor do I claim it as such.

As illustrated in the drawing, the tubes $9^a$ and $9^b$ are permanently attached to the rectangle $e, a, d, h$, directly over its holes, so that each hole corresponds to a hole or opening of a tube. The plate 15 is held in place inside the frame by the rods $7^a$ and $7^b$, which run through the tubes, then through the holes $1^a$ and $1^b$ of the frame, then through the holes $2^a$ and $2^b$ of the plate, then through the holes $3^a$ and $3^b$ of the frame, and then projecting one-half inch ($\frac{1}{2}''$) beyond the outer rectangle $f, b, c, g$. The coil spring 4 is attached to the rectangle $e, a, d, h$, at one end and to the middle of rod 6 at the other end. In Figure 1, there can be observed the wire rope 8 attached to rod 6 and rope 5 attached to the top of the plate 15.

Figure 6 indicates the floor of the vehicle underneath the knees of the operator. The rope 8 terminates and comes up through the floor about twelve inches (12") to the right of the operator's right leg. To the end of the rope is attached a fairly large handle 10. Seven inches (7") to the right of this handle is a comparatively small handle 11, which is attached to the end of rope 5, which comes up through the floor.

When the operator sees a pedestrian dangerously in the path of the vehicle, he pulls handle 10, thus pulling rope 8 and rod 6, thus pulling rods $7^a$ and $7^b$ back out of the holes of the frame and plate, whereupon the plate drops to the ground. When the operator releases the handle, the pull of coil spring 4 upon rod 6 causes rods $7^a$ and $7^b$ to spring back again into the four holes of the frame.

As seen in Figure 8, the rods $7^a$ and $7^b$ are now directly above and touching the top edge of the plate. Half of the plate is within the frame, as is illustrated by dotted lines. The other half of the plate is outside and underneath the frame, covering up the front wheels of the vehicle and the space between said wheels $12^a$ and $12^b$ which are illustrated by dotted lines.

In order to pull up the plate, the operator first pulls back handle 10, thus pulling the rods $7^a$ and $7^b$ back into the tubes and out of the way of the plate. The operator then pulls handle 11, pulling back rope 5, thus pulling up the plate. When its holes correspond to the holes of the frame, the operator releases handle 10 whereupon the rods $7^a$ and $7^b$ spring back into the holes of the frame and the plate.

Referring to Figure 7, the numerals $13^a$ and $13^b$ illustrate two curved metal strips permanently attached to the rectangle $f, b, c, g$, covering up its holes and the protruding ends of rods $7^a$ and $7^b$. The rods are thus protected from being accidentally pushed back by any object in front of the vehicle. The curved metal strips are omitted from Figure 8 for the purpose of better illustrating the operation shown in that figure.

I do not prescribe any method for attaching or guiding the ropes 5 and 8 along their courses between the safety device and the floor of the vehicle. Different constructions of vehicles require different methods of attaching the ropes. The matter of attaching the ropes is left to the judgment of the people who shall attach the ropes to the vehicles. That matter is no part of my invention, and I do not claim it.

What I claim is:—

A device of the character described, comprising a four-walled frame with two holes in one rectangle or wall and two other holes similarly placed in the opposite rectangle or wall, a plate fitting into the frame said plate having holes corresponding to and placed similarly to the holes of the frame, two short rods held together by a long rod said short rods running through the holes of the frame and plate thereby supporting the plate, two hollow tubes enclosing and supporting said short rods, two curved metal strips on the frame covering up the protruding ends of said short rods, means for pulling the short rods out of the holes, means for allowing the short rods to spring back into the holes, and means for pulling up the plate from the ground to its normal position.

MORRIS SWARTZMAN.